UNITED STATES PATENT OFFICE.

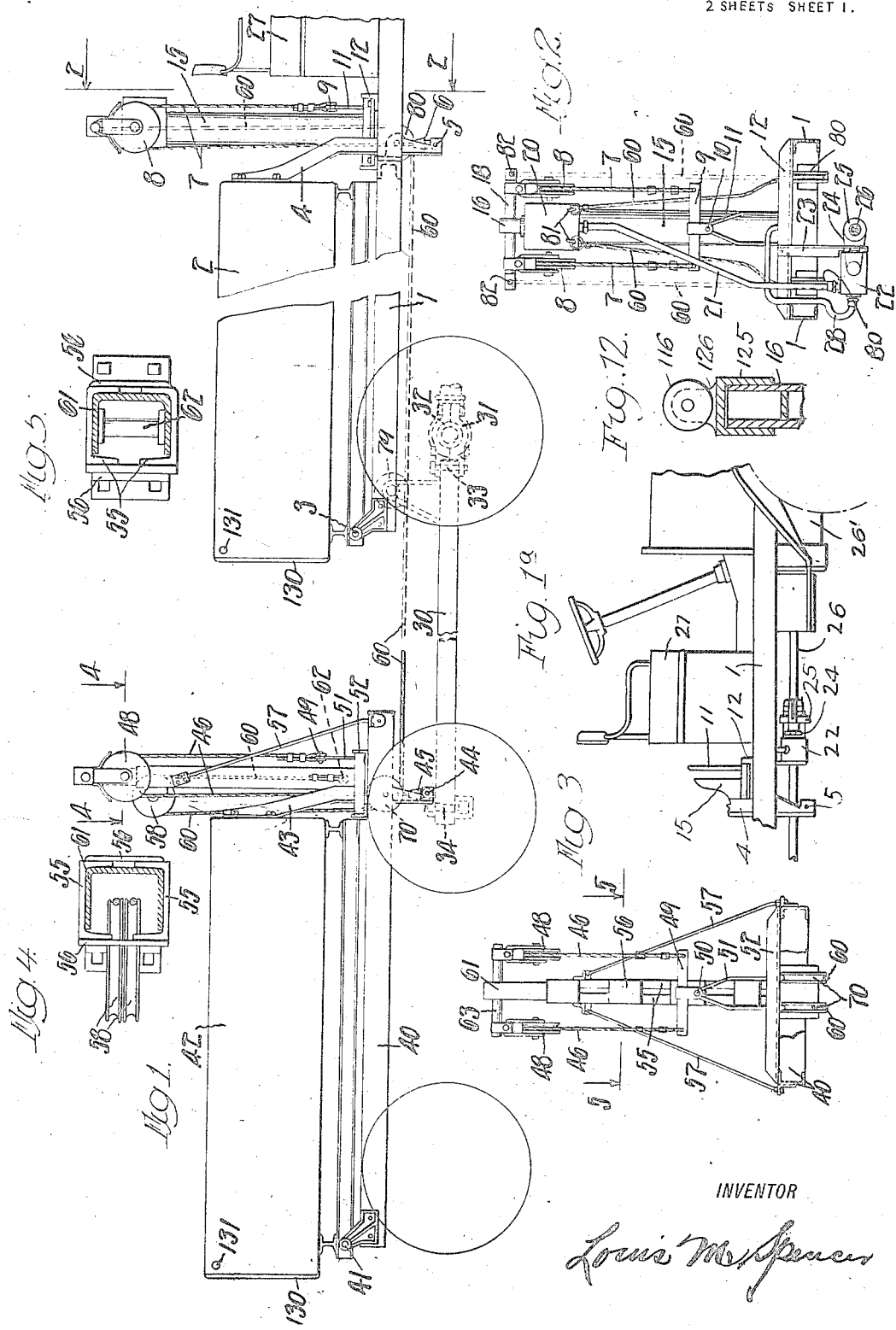

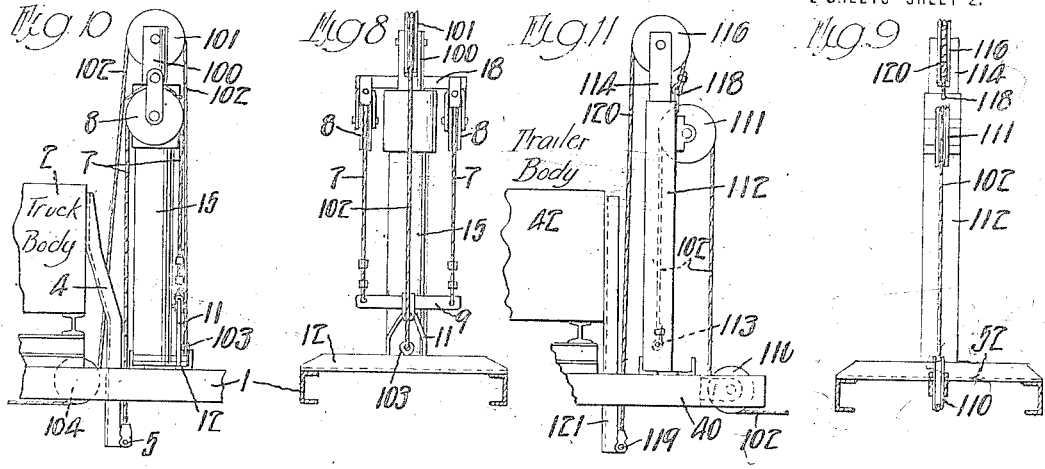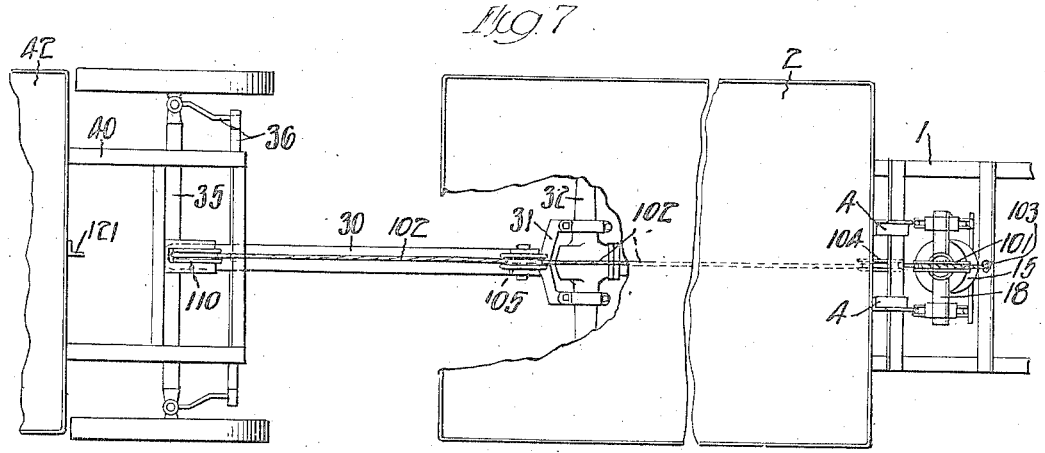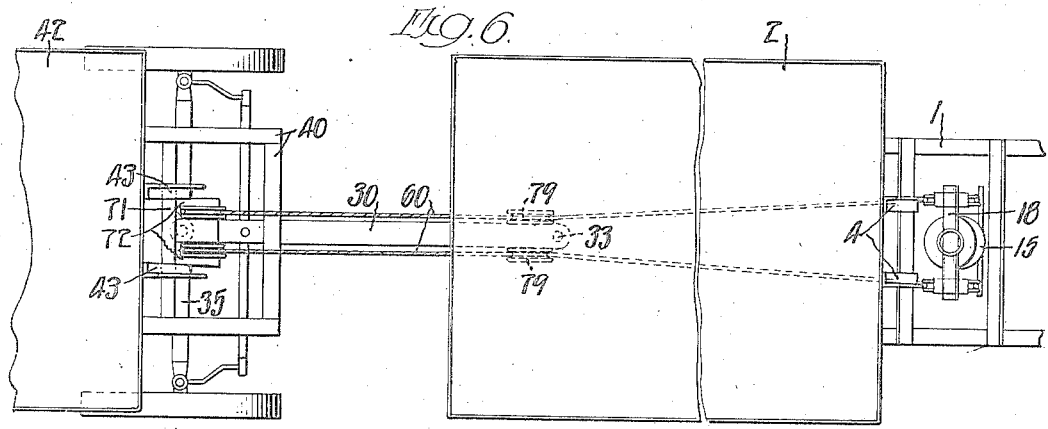

LOUIS M. SPENCER, OF HIGHLAND PARK, MICHIGAN.

TRAILER-DUMPING MECHANISM.

1,424,424.　　　　Specification of Letters Patent.　　Patented Aug. 1, 1922.

Application filed December 15, 1916. Serial No. 137,093.

*To all whom it may concern:*

Be it known that I, LOUIS M. SPENCER, a citizen of the United States, and residing at Highland Park, in the county of Wayne and State of Michigan, have invented a new and Improved Trailer-Dumping Mechanism, of which the following is a specification.

It is customary to provide motor trucks with tiltable bodies and also to equip them with a hydraulic (oil) hoist and a gear pump actuated by the propelling engine whereby the body may be tilted for dumping purposes. Again, it has been proposed to mount the front end of a two-wheeled running gear on the rear end of a tractor, said running gear having a tiltable body and the tractor having a drum around which passes a cable for tilting the body. This construction is objectionable in that toothed reversing gearing is required (on account of the non-reversibility of the internal combustion engines whereby the drum is driven) which is noisy and subject to wear, and also because it necessitates the use of friction brakes, which renders the control of the heavy body uncertain. It is also understood that attempts have been made to mount a pump on a tractor and to connect it by means of a flexible pipe with a cylinder on a trailer of the "semi" or two-wheeled type, said cylinder having a piston and piston rod, the latter of which carries pulleys over which pass cables, suitably anchored at one end and having their other ends attached to a tiltable body on the trailer; but these attempts have been unsuccessful because it is substantially impossible to maintain tight connections at the high pressures required. In each of these instances the load which can be carried and discharged by the power of the propelling engine (for convenience, hereinafter termed the "dischargeable load") is that which may be received in the single tilting body with which the truck or the train (that is, the pulling vehicle plus the pulled vehicle) is provided.

The present invention aims to greatly increase the dischargeable load capacity of the train (which is particularly valuable on hauls of considerable distance) and it consists in a truck having a propelling engine, a reduction mechanism, and a tilting body together with a trailer having a tilting body, and means whereby the reduction mechanism may be utilized to dump either body at will. In the embodiment shown a hydraulic (oil) hoist of well known construction constitutes the reduction or leverage increasing mechanism, but other devices of a widely different nature such, for example, as a hoisting drum and proper connections, might in some cases serve the same general purpose although the hydraulic hoist is much to be preferred because the use of toothed reversing gears and friction brakes is thereby avoided and certain control of the body is ensured under all circumstances. I consider myself the first to utilize the propelling engine of a steerable truck to dump both a body thereon and a body on a trailer drawn by said truck, whether the dumping of said bodies be effected singly or simultaneously. The invention also consists in a steerable pulling vehicle having a propelling engine and hydraulically operated cable hauling mechanism driven by said engine, together with a running gear attached to said pulling vehicle, said running gear having a tiltable body and means whereby the cable or cables which are actuated by the cable hauling mechanism may be utilized to tilt said body. Again, the invention consists in a steerable pulling vehicle, a four-wheeled trailer including a tilting body drawn thereby, a draw-bar connection between the vehicles of such nature as to admit of their turning sharp corners, cable hauling mechanism on the pulling vehicle actuated by the propelling engine thereof, and a cable leading from said cable hauling machanism to the trailer through which force for tilting the body may be applied. The invention also consists in a trailer having a cable guide whereby a low clearance is maintained for passing underneath street bridges, entering garages and the like, and whereby the body may nevertheless be tilted to a high degree (say 38° to 45°) to insure a complete discharge of the contents. An additional important advantage results from the fact that the center of gravity of the trailer body may thus be kept low, which relieves the body and frame of excessive rocking and twisting.

In the drawings, Fig. 1 is a side elevation, parts being broken away, showing one embodiment of the invention. Fig. 1ª is a continuation thereof. Fig. 2 is a section on line 2—2 of Fig. 1. Fig. 3 is a front view of the hoisting mechanism on the trailer, parts being broken away. Fig. 4 is a section on the line 4—4 of Fig. 1. Fig. 5 is a section on the line 5—5 of Fig. 3. Fig. 6 is a plan view showing the course of the cables in passing from the truck to the trailer. Fig. 7 is a plan view corresponding to Fig. 6 showing a modification in which but one cable is used. Fig. 8 is a view corresponding to Fig. 2, the pump and connecting pipes being omitted, showing the modification of the hoisting mechanism on the truck to adapt it to use with the single cable, and Fig. 9 is a similar view corresponding to Fig. 3. Figs. 10 and 11 are fragmentary side views corresponding, respectively, to Fig. 8 and Fig. 9. Fig. 12 is a vertical section showing a sheave carrying cap or saddle fitted on the upper ends of existing piston rods to adapt them to the one-cable modification.

In the embodiment shown in Figs. 1 to 6, inclusive, 1 indicates the frame and 2 the body of a truck, said body being mounted to swing about pivots 3 located near the rear end of the vehicle, and having body arms 4 secured to and depending from its front end. The lower ends of these arms are detachably secured by removable pins or bolts 5 to shackles 6 (Fig. 1) on the ends of cables 7 that pass upwardly over pulleys 8 and then downwardly to an equalizing bar 9, the latter being pivoted by the bolt or pin 10 (that may be removable) to the shackle 11 (Fig. 2) anchored to the cross frame 12. From the cross frame rises the hoisting cylinder 15 having a piston (not shown) and piston rod 16 that bears a cross-bar 18 from which the pulleys 8 are suspended in such manner as to allow free universal swinging movement. The cylinder preferably bears an expansion tank 20 for the oil which is conducted by a pipe 21 to a gear pump 22 mounted on an arm 23 depending from the cross frame. The pump is driven by means of a chain 24 and a clutch gear 25 from the propeller or other suitable shaft 26 on the truck (it being understood that the shaft is in turn driven by an internal combustion propelling engine 26' located forward of the driver's seat 27); and the liquid is discharged from the pump through a pipe 28 into the lower end of the cylinder. A suitable valve (not shown) is employed whereby the liquid may be directed through the pump casing either in such direction as to elevate the piston and piston rod, or to allow the latter to lower gradually, or to entirely break the connection between the pipes. The control levers for both the clutch 25 and the valve mechanism are preferably mounted on the expansion chamber within convenient reach of a driver. The general arrangement of parts thus far described is well known with the exception that the connections 5 and 10 have heretofore been of a permanent nature, and with the further exception that no means whereby the device could have been employed for tilting a trailer body (as hereinafter pointed out) were present.

Connected to the truck by means of a stiff draw-bar or tongue 30 (of any suitable construction; it must take heavy thrusts) is a trailer which will be described presently. As shown, the front end of the draw-bar is received in a socket in a strong divided bracket 31 (Figs. 1 and 7) clamped about the central portion of the axle housing 32 and may swing horizontally and to a limited extent vertically about a draw bolt 33; at its rear end the draw-bar is pivoted by the king bolt 34 to the front axle 35 and is connected to the steering mechanism 36, but this construction is merely by way of example.

The trailer includes the frame 40 having near its rear end horizontal pivots 41 on which the body 42 is adapted to be swung for dumping purposes. The front end of the body has secured thereto and depending therefrom body arms 43 which are pivotally connected by means of bolts or pins 44 to shackles 45 on the ends of hoisting cables 46. The latter pass upwardly over pulleys 48 and have their other ends attached to an equalizing bar 49 pivoted at 50 to a shackle 51 which is anchored to a suitable cross-frame 52 secured to the main frame 40. Rising from the cross-frame is a fixed post that, as shown in Figs. 4 and 5, is preferably made up of channel irons 55 turned face to face and having their opposed flanges joined by suitable lacing plates 56. The post may be braced from the front end of the frame by rods or other members 57. Sheaves or pulleys 58 are mounted on the upper end of the post, preferably at its rear side, and are of such size as to guide actuating cables 60 into substantial alignment with the longitudinal center of the post. Slidable in the post and conforming closely to the interior thereof is a suitable thrust bar 61, preferably of channel cross-section, to the lower end of which the lower ends of the cables 60 are anchored at 62. At its upper end the bar 61 bears a cross-arm 63 (Fig. 3) on which the pulleys 48 are suspended in such manner as to allow free universal swinging movement.

The actuating cables 60, as stated before, pass from the lower end of the thrust bar up over the sheaves 58; from this point they extend preferably directly downwardly around guide sheaves 70 that are suitably mounted near the longitudinal center line of the frame 40 and substantially above the center about which the draw-bar 30 swings, say by means of a cross frame 71 and bearings 72 (Fig. 6). The cables 60 then continue forwardly along the draw-bar 30 to sheaves 79 substantially above the front end of the draw-bar and thence as indicated in dashed lines, to distinguish more clearly from cables 7 (Fig. 1) to sheaves or pulleys 80 mounted (similarly to the sheaves 70) on the frame 1, from which they rise and are normally hung on hooks 81 or the like (Fig. 2) carried on the expansion chamber 20 or elsewhere.

Therefore the body of the truck may be tilted in the usual manner without in any way affecting the trailer body. Should it be desired to tilt the trailer body independently of the truck body, it is only necessary to remove the bolts 5 or the bolt 10 (preferably the former, as that allows the piston rod to be projected a maximum distance from the cylinder) and to then shackle the cables 60 to the cross-arm 18, as indicated in dashed lines (Figs. 1 and 2), for example, by passing clevis bolts through the holes 82 in the arm. It is, of course, apparent that by leaving the bolts 5 and 10 in place and connecting the cables 60 to the cross-arm 18 as stated, both bodies may be tilted at the same time. It will also be understood that the truck body may be dumped first, the element through which dumping force for the trailer is transmitted being disconnected or out of operation for the time being, and that the trailer may be dumped thereafter, during which latter operation the truck body (then empty) may be manipulated as in dumping. Again, by disconnecting the draw-bar and cables 60, the truck may be used to draw any one of a number of trailers, some of which are in the course of loading while others are on the way to the dump. The body 2 may in some cases be omitted or be fixed to the frame 1; the resulting combination still possesses important advantages over present practice in that the control of the various steps of tilting the trailer body is certain, and in that wear and noise incident to the use of toothed gearing is avoided; also in that toothed reversing gears as well as friction clutches are avoided.

A somewhat more simplified construction, in that but a single actuating cable is used, is shown in Figs. 7 to 12, inclusive. In this instance the piston rod 100 of the hydraulic hoist is extended upwardly somewhat above the cross-arm and is slotted to afford a central mounting for the sheave or pulley 101. A trailer body actuating cable 102 passes over the sheave and has its front end detachably anchored at 103 to the cross frame or other fixed portion of the vehicle. The other portion of the cable passes downwardly from the sheave and under the sheave 104 (Fig. 10) suitably supported on the frame, then rearwardly to the sheave 105 (Fig. 7) which is substantially over the front end of the draw-bar 30, then along the draw-bar to the sheave 110 (Fig. 11) on the trailer frame, then up over a sheave 111 on the upper front side of the post 112 (that corresponds to the post heretofore described) and is finally anchored at 113 to the lower end of the thrust bar 114. The thrust bar differs from the thrust bar heretofore described in that the cross bar is omitted and its place taken by a centrally arranged sheave 116. A single hoisting cable 120 is anchored to the post 112 at a point 118 just above and in line with the sheave 111 and has its other end connected at 119 to a single centrally arranged, depending body iron 121 on the body 42. The cables 7 and associated parts for applying the lifting force to the body 2 are employed as before, and by removing the bolts 5 or detaching the cable 102 at 103 either the trailer body or the truck body may be tilted at will.

While but one trailer is shown, it is merely a matter of duplication to add a second trailer (or more) and to provide an additional cable or cables (properly guided) through the first trailer) whereby the body (or bodies) may be tilted at will.

In cases in which the piston rod 16 extends but a short distance above the cross arm, it may be adapted to the single cable installation by providing a cap 125 (Fig. 12) having upstanding ears 126 in which the sheave 116 is mounted.

It is of course understood that the bodies 2 and 42 are equipped with doors 130 swingable about pivots 131 and normally connected to the body by latches (not shown) in the ordinary way.

The details of the construction may be widely varied without departing from the spirit of the invention, and I do not wish to be limited except as indicated by the claims. The word "cable" as used herein indicates either the cables shown or any other flexible member such as a chain whereby the same function is performed.

I claim:—

1. In combination, a pulling vehicle having a tiltable body and a propelling engine, a pulled vehicle having a tiltable body, and means whereby the propelling engine may be utilized to tilt either body at will.

2. In combination, a pulling vehicle having a tiltable body and a propelling engine, a pulled vehicle having a tiltable body, and means carried entirely by said vehicles whereby the propelling engine may be utilized to tilt either body at will.

3. In combination, a truck having a tiltable body, a propelling engine and a leverage-increasing mechanism for the engine, a trailer also having a tiltable body, a connection between the vehicles whereby they are enabled to pass around sharp corners, and means whereby the leverage-increasing mechanism may be utilized to tilt either body at will.

4. In combination, a truck having a tilting body, a propelling engine, a pump driven by said engine, a hoisting cylinder, a piston and a piston rod associated with said pump, a trailer having a tilting body, and means whereby the piston rod may be utilized to tilt either body at will.

5. In combination, a pulling vehicle having a tilting body and a propelling engine, a pulled vehicle having a tilting body, a connection between said vehicles whereby they are enabled to pass around sharp curves, and means whereby the propelling engine may be utilized to simultaneously tilt both bodies.

6. In combination, a truck having a tilting body arranged to swing about an axis near the rear end of the truck, hoisting mechanism for the front end of the body, said mechanism including an upwardly projectable member, a trailer having a body tiltable about an axis near the rear end thereof, hoisting mechanism for the front end of the last mentioned body, said mechanism including a projectable member, and means for actuating the projectable member on the truck alone to tilt the truck body or for actuating both projectable members simultaneously to tilt the trailer body, whereby the bodies may each be tilted at a high angle and whereby clearance for passing overhead obstructions is insured.

7. In combination, a front running gear and a rear running gear, a body tiltable on said rear running gear, a fixed guide on said rear running gear, a member slidable in said guide, a cable for actuating said member, said cable leading to the front running gear, means on the front running gear for hauling said cable, and separate cable means on the rear running gear associated with the slidable member for tilting the body.

8. In combination, a front running gear and a rear running gear, a body tiltable on said rear running gear, a fixed guide on said rear running gear, a member slidable in said guide, a cable for actuating said member, said cable leading to the front running gear, means on the front running gear for hauling said cable, and means on the rear running gear swingable in respect to said slidable member for tilting said body.

9. In combination, a front running gear and a rear running gear, a body tiltable on said rear running gear, an upright guide on said rear running gear, a member slidable in said guide, a cable for actuating said member, said cable leading to the front running gear, means on the front running gear for hauling said cable, and cable means on the rear running gear associated with the slidable member for tilting the body whereby the body may be tilted to a high angle and whereby clearance of overhead obstructions is obtained.

10. A highway train comprising a pulling vehicle having a propelling engine, a trailer, draw bar means having a swingable connection with the pulling vehicle and also with the trailer whereby the train is enabled to pass around sharp curves, a pump carried by the pulling vehicle and driven by the engine, a piston and piston rod associated with the pump and also mounted on the pulling vehicle, and means carried wholly on the pulling vehicle and the trailer whereby the piston rod may be utilized to tilt the trailer body.

11. A highway train comprising a pulling vehicle having a propelling engine, a trailer, draw bar means having a swingable connection with the pulling vehicle and also with the trailer whereby the train is enabled to pass around sharp curves, a pump carried by the pulling vehicle and driven by the engine, a piston and piston rod associated with the pump and also mounted on the pulling vehicle, and means, carried wholly by the pulling vehicle and the trailer, constructed and arranged to normally cause stresses in the piston rod substantially only longitudinally of the axis thereof, whereby the piston rod may be utilized to tilt the trailer body.

12. A highway train comprising a pulling vehicle having a propelling engine, a trailer, draw bar means having a swingable connection with the pulling vehicle and also with the trailer whereby the train is enabled to pass around sharp curves, a pump carried by the pulling vehicle and driven by the engine, a piston and piston rod associated with the pump and also mounted on the pulling vehicle, and means, carried wholly by the pulling vehicle and the trailer and including a pulley carried by the piston rod and arranged substantially in the central plane thereof and a cable associated with said pulley, whereby the piston rod may be utilized to tilt the trailer body.

13. In combination, a pulling vehicle having a propelling engine, a pulled vehicle having a tiltable body, a draw bar whereby the pulled vehicle is connected to the pulling vehicle and whereby the pulling vehicle is enabled to turn sharply in respect to the pulled vehicle, cable hauling means on the pulling vehicle, a cable connected to the cable hauling means, means including a guide carried by the draw bar, means whereby the cable is guided in substantially parallel relation to said draw bar, and means for utilizing said cable to tilt the body.

14. In combination, a pulling vehicle having an internal combustion propelling engine, a pulled vehicle having a tiltable body, a draw bar whereby the pulled vehicle is connected to the pulling vehicle, and whereby the pulling vehicle is enabled to turn sharply in respect to the pulled vehicle, an upright hydraulic hoist on the pulling vehicle, said hoist being actuated by said internal combustion engine, a cable actuated by said hoist, a pulley substantially at the base of the hoist about which the cable passes and from which it leads rearwardly, means whereby the cable is guided in substantially parallel relation to said draw bar, and means for utilizing said cable to tilt the body.

15. In combination, a pulling vehicle having a propelling engine and a tiltable body, a pulled vehicle having a tiltable body, a draw bar whereby the pulled vehicle is connected to the pulling vehicle and whereby the pulling vehicle is enabled to turn sharply in respect to the pulled vehicle, cable hauling means on the pulling vehicle, and means including a cable guided in substantially parallel relation to said draw bar whereby the cable hauling means may be utilized to tilt either body at will.

16. In combination, a pulling vehicle having a propelling engine and a tiltable body, a pulled vehicle having a tiltable body, a draw bar whereby the pulled vehicle is connected to the pulling vehicle and whereby the pulling vehicle is enabled to turn sharply in respect to the pulled vehicle, a hydraulic cable hauling device on the pulling vehicle, said device including a pump, a cylinder and a piston rod and being actuated by said engine, and means including two cables arranged to be interchangeably operatively connected to the piston rod through which force tending to tilt either body at will may be transmitted from the cable hauling device.

17. In combination, a pulling vehicle having a tilting body and a propelling engine, a pulled vehicle having a tilting body, and means whereby the propelling engine may be utilized to simultaneously tilt both bodies.

18. In combination, a pulling vehicle including an upwardly projectable member, a trailer having a body tiltable about an axis near the rear end thereof, hoisting mechanism for the front end of the body, said mechanism including a projectable member, means for actuating the projectable member on the pulling vehicle, means whereby the movement of the last mentioned projectable member causes the projectable member on the trailer to be projected, and means whereby the movement of the projectable member on the trailer causes the body to tilt.

19. In combination, a pulling vehicle having a body tiltable about a horizontal axis near its rear end, a pulled vehicle having a body tiltable about a horizontal axis near its rear end, cable means connected to the front portion of the first mentioned body on opposite sides of the longitudinal center thereof, a single cable connected to the front portion of the second mentioned body in substantially the longitudinal central plane thereof, and a common means whereby either the first named cable means may be utilized to tilt the first named body or the single cable may be utilized to tilt the second named body.

20. In combination, a truck having a propelling engine and a body tiltable vertically about a horizontal axis near the rear end of the truck, a trailer having a tiltable body, and means for utilizing said engine for tilting the bodies, said means including a flexible power transmitting element extending rearwardly from the truck below the level of the rear end of the truck body when the latter is fully tilted.

21. In combination, a running gear, a body tiltable on said running gear about a horizontal axis near one end thereof, an upright guide centrally of said running gear near the other end thereof, a channeled member slidable in said guide, a sheave mounted on the upper portion of said guide and projecting into the channel of said member, a cable passing over the sheave and along the channel of said member and lifting said member from the lower end portion thereof, and means associated with the upper end portion of said channeled member on opposite sides thereof for lifting the adjacent end of said body at substantially twice the rate said member is lifted.

22. A vehicle comprising a running gear, a body tiltable on said running gear about a horizontal axis near one end thereof, an upright guide, a channeled member slidable in said guide, a sheave carried by the upper portion of the guide and projecting into the channel of said member, a second sheave substantially at the base of the guide, a cable passing over the sheaves and forwardly from the second sheave and being anchored to the lower portion of said member whereby the member may be elevated in the guide, a cross-bar, sheaves carried by said cross-bar on opposite sides of the channeled member, and cable means passing over the last named sheaves for causing the adjacent end portion of the body to rise substantially twice as fast as said member.

23. In combination, a pulling vehicle having a propelling engine, a pulled vehicle having a tiltable body, a draw-bar connecting the pulled vehicle to the pulling vehicle, cable hauling means on the pulling vehicle actuated by said engine, a cable through which force is transmitted from said cable hauling means for tilting said body, and a guide for said cable carried by the draw-bar.

24. In combination with a pulling vehicle having a main frame, a tiltable body, a propelling engine, and a hydraulic hoisting mechanism for tilting the body, said mechanism including a pump driven by said engine, a pulled vehicle having a tiltable body, a cross-frame on the pulling vehicle, a second cross-frame on the pulled vehicle, cable guides on the cross-frames, a thrust connection between the vehicles whereby they are enabled to turn about sharp corners, and a cable passing about the guides through which force from the hydraulic hoisting mechanism may be transmitted for tilting the body of the pulled vehicle.

25. In combination, a truck having a tiltable body and a propelling engine, a trailer having a tiltable body, and means whereby the engine may be utilized to tilt either body at will, said means including a cable and guiding means therefor whereby said cable is guided in the pulling vehicle beneath and longitudinally of the body thereon.

26. A steerable highway train comprising a truck having a dumping body and a propelling engine, a trailer pulled by said truck and also having a dumping body, said train including instrumentalities whereby said bodies may be dumped by said engine.

27. In combination, a pulling vehicle having a propelling engine and a reciprocable member actuated thereby, a pulled vehicle having a tiltable body, a reciprocable member on the pulled vehicle arranged to tilt the body, and means for causing the movement of the first named reciprocable member to be repeated in said second reciprocable member.

28. In combination, a pulling vehicle having a propelling engine, a trailer having a tiltable body, a thrust element connecting the rear end of the pulling vehicle and the front end of the pulled vehicle, said thrust element being so connected to the vehicles as to allow them to pass around sharp curves, cable hauling means on the pulling vehicle, means for actuating the cable hauling means from the engine, cable guiding means carried by the thrust element, and means, including a cable passing from the pulling vehicle to the pulled vehicle, for utilizing said cable hauling means for tilting the body of the trailer, said cable being guided by said cable guiding means.

29. A highway train comprising a truck having a propelling engine and a tiltable body, a trailer having a tiltable body, thrust means having a swingable connection with the truck and also with the trailer whereby the train is enabled to pass around sharp curves, means for utilizing the engine to tilt the trailer body and the truck body, said means including a flexible element extending across between the truck and trailer whereby power may be transmitted.

30. In combination, a truck having a propelling engine and a body tiltable vertically about a horizontal axis near the rear end of the truck, a trailer having a tiltable body, and means for utilizing said engine for tilting the bodies, said means including a flexible power transmitting element extending rearwardly from the truck substantially centrally thereof and below the level of the rear end of the truck body when the latter is fully tilted.

31. Self propelled load carrying means including a tiltable body, an upright hoist for tilting said body, a cable guide near the base of the hoist, and means for utilizing said hoist for tilting the body, said means including a cable actuated by said hoist and passing around the cable guide and leading thence directly rearwardly therefrom.

32. In combination, a pulling vehicle having a propelling engine and a fixed guide, a projectable member slidable in said guide, a sheave mounted on the projectable member and arranged substantially in the central longitudinal plane of the vehicle, a pulled vehicle having a tiltable body, means for utilizing the movement of the projectable member for tilting the body of the pulled vehicle, said means including a cable passing over the sheave.

33. In combination, a pulling vehicle having a propelling engine and an upright fixed guide, a projectable member slidable in said guide, a saddle conforming to and mounted on the upper end of the projectable member, a sheave mounted to rotate about a horizontal axis, said sheave being carried by the saddle, a pulled vehicle having a tiltable body, means for utilizing the movement of the projectable member for tilting the body of the pulled vehicle, said means including a cable passing over the sheave.

34. A roadway train comprising a truck having a propelling engine, a guide on the truck, a member projectable in respect to said guide, a trailer connected to the truck by means of a draw bar, said trailer having a tiltable body, means for utilizing the movement of the projectable member for tilting the body, said means including a cable detachably connected to the projectable member.

35. Load carrying means comprising a wheel supported running gear including propelling means, a guide and a member projectable along said guide, said guide being carried by the running gear, means for utilizing the propelling means to project the projectable member, a frame operatively connected to the running gear and swingable in respect thereto to pass around curves, a tiltable body mounted on the frame, and means whereby the movement of the projectable member causes the body to tilt.

36. A roadway train comprising a truck having a propelling engine and a tiltable body, a trailer having a tiltable body, said truck also having a hydraulic hoisting device including a cylinder and a piston rod projecting therefrom, and means, including three cables associated with the projecting end of the piston rod whereby the two bodies may be tilted.

37. Self propelled load carrying means including an upstanding cylinder, a piston and piston rod construction reciprocable therein, a sheave mounted substantially at the base of the cylinder, a tiltable body, an upright guide forwardly of the body, a thrust member slidable in the guide, cable means passing around the sheave and connecting the piston rod construction with the thrust member, whereby the thrust member is caused to rise when the piston rod rises, and cable means connecting the thrust member with the body so constructed and arranged that the front end of the body is caused to rise substantially twice as fast as the thrust member.

38. In combination a pulling vehicle, a wheeled frame drawn thereby and swingable in respect thereto about a vertical axis, said frame having a body pivoted near its rear end to tilt, cable hauling mechanism on the pulling vehicle, and upright mechanism carried by the frame forwardly of the body for lifting the latter, a cable leading from the cable hauling mechanism to the upright mechanism to actuate the latter, said upright mechanism including means whereby the front end of the body is elevated at a greater speed than the cable is hauled.

LOUIS M. SPENCER.